US006386536B1

(12) United States Patent
Juan

(10) Patent No.: US 6,386,536 B1
(45) Date of Patent: May 14, 2002

(54) HARDCOPY APPARATUS AND METHOD FOR LOADING MEDIA

(75) Inventor: Fernando Juan, Barcelona (ES)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/428,758

(22) Filed: Oct. 28, 1999

(30) Foreign Application Priority Data

Oct. 30, 1998 (EP) ............................................ 98120707

(51) Int. Cl.[7] ............................ B65H 5/22; G03B 27/60

(52) U.S. Cl. ........................ 271/276; 271/902; 271/314; 271/194; 269/21; 355/73

(58) Field of Search ................................. 271/194, 196, 271/902, 314, 276; 355/73; 269/21; 346/134

(56) References Cited

U.S. PATENT DOCUMENTS

| | | | | |
|---|---|---|---|---|
| 4,504,843 A | * | 3/1985 | Prohl et al. | 271/276 |
| 4,651,984 A | | 3/1987 | Emrich | 271/237 |
| 4,998,715 A | | 3/1991 | Milan et al. | 271/197 |
| 5,124,728 A | | 6/1992 | Denda | 346/134 |
| 5,414,491 A | * | 5/1995 | Bryant | 355/73 |
| 5,717,446 A | | 2/1998 | Teumer et al. | 347/35 |
| 5,838,354 A | * | 11/1998 | Yamada et al. | 374/101 |
| 6,179,285 B1 | * | 1/1999 | Teumer et al. | 271/194 |

FOREIGN PATENT DOCUMENTS

| | | | |
|---|---|---|---|
| EP | 0.379 306 A3 | 7/1990 | B65H/3/06 |
| EP | 0 379 306 A2 | 7/1990 | B65H/3/02 |
| EP | 0900664 A1 | 3/1999 | |
| JP | 02307797 | 12/1990 | B43L/12/00 |

OTHER PUBLICATIONS

European Search Report for Application No. 98120707.9 dated Mar. 23, 1999.

* cited by examiner

*Primary Examiner*—Christopher P. Ellis
*Assistant Examiner*—Mark A. Deuble

(57) ABSTRACT

A hardcopy apparatus including a main roller and a loading mechanism to load a medium into the hardcopy apparatus, said loading mechanism including a vacuum holddown input unit to hold media down onto a surface of said holddown unit. In addition, a method of loading a medium into a hardcopy apparatus including a vacuum holddown unit, a driving roller and a secondary roller, comprises the steps of: manually positioning the medium onto a surface of the holddown unit; by rotating the secondary roller, advancing the medium towards the main roller; and engaging the medium to the main roller.

18 Claims, 5 Drawing Sheets

HARDCOPY APPARATUS AND METHOD FOR LOADING MEDIA

FIELD OF THE INVENTION

The present invention generally relates to hardcopy apparatus, such as copiers, printers, scanners, facsimiles, and more particularly to improved media holddown devices for such apparatus.

BACKGROUND OF THE INVENTION

Hardcopy apparatus and particularly in apparatus handling media of big size, such as large format printers, are supplied by moving the end of the printing media manually towards the input portion of the apparatus, the printing media usually being a roll of printing media or sheet of printing media or the like, the printing media being pushed manually until its front edge is gripped between the feed roller and the drive roller which advance the sheet or the roll.

A problem which frequently arises in apparatus of this type is that, given the manual guidance of the printing media has to be carried out at a considerable distance from the front edge of the printing media, it is difficult to achieve good alignment of the printing media and , in many cases, this delays the operation of the printer when this operation has to be repeated, since the printer cannot tolerate appreciable deviation of the printing media from the theoretical position.

As is clear, the need from a repetition of the said loading operation results in loss of time.

Furthermore, a feeding operation of a printing media not properly positioned may result in a paper jam, with a consequent loss of paper, which may be very expansive depending on its size and quality, as well as in a further loss of time for removing the paper jam.

Alternatively, an improved method of loading media into a printer is disclosed in the European patent application no. 97 500153.8. In this application the method of loading the printing media into the printer provides for the operation of the rollers for advancing the printing media to be activated manually by the operator himself at the moment when the said printed media is introduced into the printer and at the moment when the operator estimates that the sheet of printing media is correctly positioned, without deviation.

However, also in this case manual loading and positioning of media appears to be cumbersome, in particular when cut sheet of media are employed. In fact it is still difficult to achieve good alignment of the printing media since few references are provided to the operator in order to estimate if the media is correctly positioned or not.

Finally, both the solutions cause a sharp change of status of the media, i.e. from completely free to stably locked. This change may cause an unintentional modification of the position of the media, which may result in an incorrect feeding of the sheet into the printer.

Conventionally, sheet holddown devices such as electrostatic or suction devices are employed only to reduce the effects of paper curl and cockle on dot placement during printing. In vacuum holddown devices, sheet flatness is maintained by providing suction between a support plate and the back surface of a sheet to be handled.

Cockle effect is the reluctance of the paper to bend smoothly. Instead it bends locally in a sharp fashion, creating permanent wrinkles.

Although conventional vacuum holddown devices are fairly effective in maintaining sheet flatness during printing, they have drawbacks. One drawback is the complexity of maintaining the same holddown force along the entire width of the medium while printing, i.e. in the direction of the printheads motion. This is due to the losses of air that the conventional devices allow, causing the medium to be subject to different forces, i.e. forcing the medium to rotate while it is advanced in the direction of the media motion.

Another drawback is that on one hand the maximum holddown force on a sheet is limited because of the necessity to maintain low frictional loads on transport devices which index the sheets. In conventional inkjet printers, such limitations can cause pen-to-sheet spacing distances to vary from swath to swath. Consequently, the holddown pressure at a localised area being printed may be insufficient to flatten cockles and other paper irregularities. On the other hand the vacuum required to eliminate cockle wrinkles in a printout would be so high that is normally unfeasible; in fact, high vacuum may suck the ink right through the paper and at the same time generate a lot of noise.

Applicant has then experimented that the employment of a vacuum holddown input unit may help media to be properly manually positioned by the operator.

SUMMARY OF THE INVENTION

The present invention seeks to provide an improved hardcopy apparatus and method of loading a printing medium in the hardcopy apparatus.

According to an aspect of the present invention, there is provided a hardcopy apparatus comprising a main roller and a loading mechanism to load a medium into the hardcopy apparatus, said loading mechanism comprises a vacuum holddown input unit to hold media down onto a surface of said holddown unit.

This reduces the risk of any unintentional modifications of its positioning. In fact the medium always stays in a sort of partially bounded condition, i.e. it is stably held, unless a significant force is applied in order to have it moved, since the vacuum is not switched off during the positioning operation. It should be noted that, direct contact of the holddown device with the printing surface is avoided to minimize signs and other adverse affects on print appearance.

Preferably, said holddown unit comprises a vacuum source, connected to atmosphere through a plurality of first apertures formed into the surface, and a vacuum channel to generate a negative pressure capable of holding down media onto the surface, while loading a medium.

In a preferred embodiment, said surface further comprises a plurality of recesses, at least one of said plurality of first apertures is located in one of said plurality of recesses.

However, the air flow between the surface and the back of the medium may generate noise in correspondence of the first apertures.

Accordingly, in a preferred arrangement, at least one of said plurality of recesses comprises a first portion capable of uniformly distributing the vacuum on an area substantially bigger than the aperture itself, and a second portion so shaped to reduce air flow noise interference with media.

This result is achieved since the shape of the recesses is designed for providing the air flow with a smooth transition, reducing the resulting noise.

Typically, said holddown unit further comprises a plurality of second apertures formed into the surface to create an additional negative pressure capable to increase the stability of media onto the surface. Advantageously, said holddown unit further comprises means to extend the additional negative pressure to a position closer to the drive roller.

This feature allows the media to be loaded in a position closer to the drive roller, reducing the distance to be covered during the feeding operation to engage an edge of the medium with the drive roller.

Preferably, said means for extending the negative pressure comprise a plurality of grooves extending towards the drive roller and a number of said plurality of second apertures are located within said grooves and each aperture (330) of said plurality of second apertures being located within a groove.

In a further preferred embodiment, said holddown unit further comprises feeding means, being the generated negative pressure capable to engage the back of the medium with said feeding means and transfer said medium to engage said drive roller.

Accordingly, the apparatus may be kept free from any additional elements which may reduce the operator's access to the input surface, reducing the complexity of his manual activity.

Additionally, said feeding means comprises one or more overdrive wheels disposed to form on the surface an alternating sequence of recesses and overdrive wheels in the direction perpendicular to the direction of motion of media.

In a further preferred arrangement, the holddown unit further comprises a first reference for placing the medium in a correct position on the surface, said first reference crossing the surface in the direction perpendicular to the direction of motion of media and a second reference for placing the medium in the right position on the surface, said second reference crossing the surface in the direction of motion of media.

Thanks to the input surface mainly free of obstacles the operator can be provided with a full visual control of a plurality of references, to help him in positioning the medium.

Preferably, said first reference is tangent to the portion of the grooves closer to the main roller. In this way, one edge of medium can be positioned at the very limit of the area capable of applying vacuum to the back of the medium.

More preferably, said medium is a cut sheet of media.

Viewing another aspect of the present invention, there is also provided, a method of loading a medium into a hardcopy apparatus including a holddown unit provided with a vacuum source, a main driving roller and a secondary roller, which comprises the steps of: manually positioning the medium onto a surface of the holddown unit; by rotating the secondary roller, advancing the medium towards the main roller; and engaging the medium to the main roller.

Preferably, the step of keeping the vacuum source activated during all the previous steps, in order to achieve the engagement of the secondary roller with the back of the medium.

In a preferred embodiment, the hardcopy apparatus further comprises one or more wheels, while the step of advancing the medium comprises the step of moving the one or more wheels clockwise or counter-clockwise, depending on the advancing direction of the medium.

BRIEF DESCRIPTION OF THE DRAWINGS

The present invention will be described further, by way of example only, with reference to an embodiment thereof as illustrated in the accompanying drawings in which.

DETAILED DESCRIPTION OF THE PREFERRED EMBODIMENT

Figure 1:
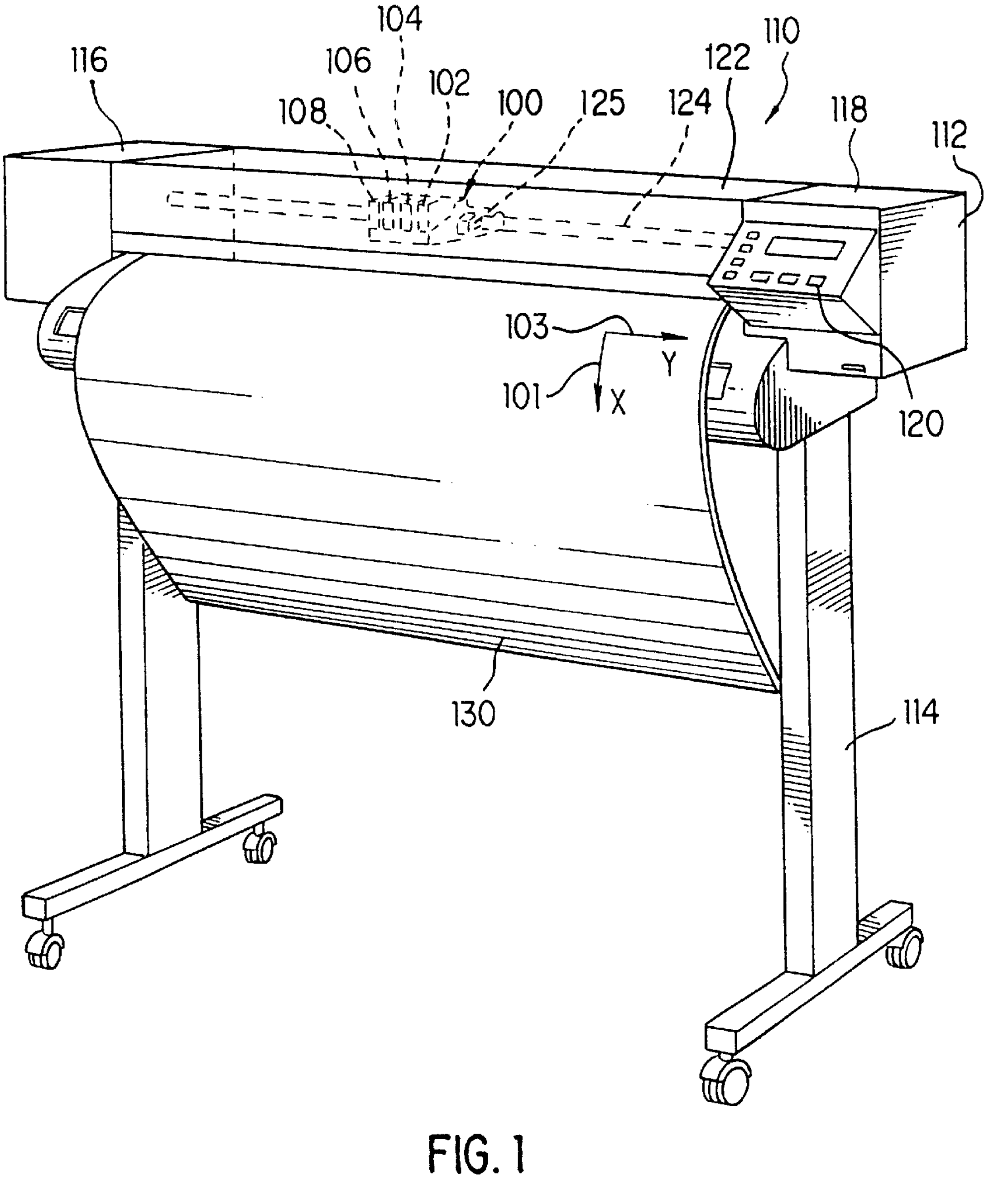
FIG. 1 is a perspective view of an inkjet printer incorporating the features of the present invention.

Referring to FIG. 1, a printer 110 includes a housing 112 mounted on a stand 114. The housing has left and right drive mechanism enclosures 116 and 118. A control panel 120 is mounted on the right enclosure 118. A carriage assembly 100 illustrated in phantom under a cover 122, is adapted for reciprocal motion along a carriage bar 124, also shown in phantom. The carriage assembly 100 comprises four inkjet printheads 102, 104, 106, 108 that store ink of different colours, e.g. black, magenta, cyan and yellow ink respectively, and an optical sensor 105. As the carriage assembly 100 translates relative to the medium 130 along the X and Y axis, selected nozzles of the printheads 102, 104, 106, 108 are activated and ink is applied to the medium 130. The colours from the three colour printheads are mixed to obtain any other particular colour. The position of the carriage assembly 100 in a horizontal or carriage scan axis (Y) is determined by a carriage positioning mechanism with respect to an encoder strip. (not shown). A print medium 130 such as paper is positioned along a vertical or media axis by a media axis mechanism (not shown). As used herein, the media axis is called the X axis denoted as 101, and the scan axis is called the Y axis denoted as 103.

Figure 2:
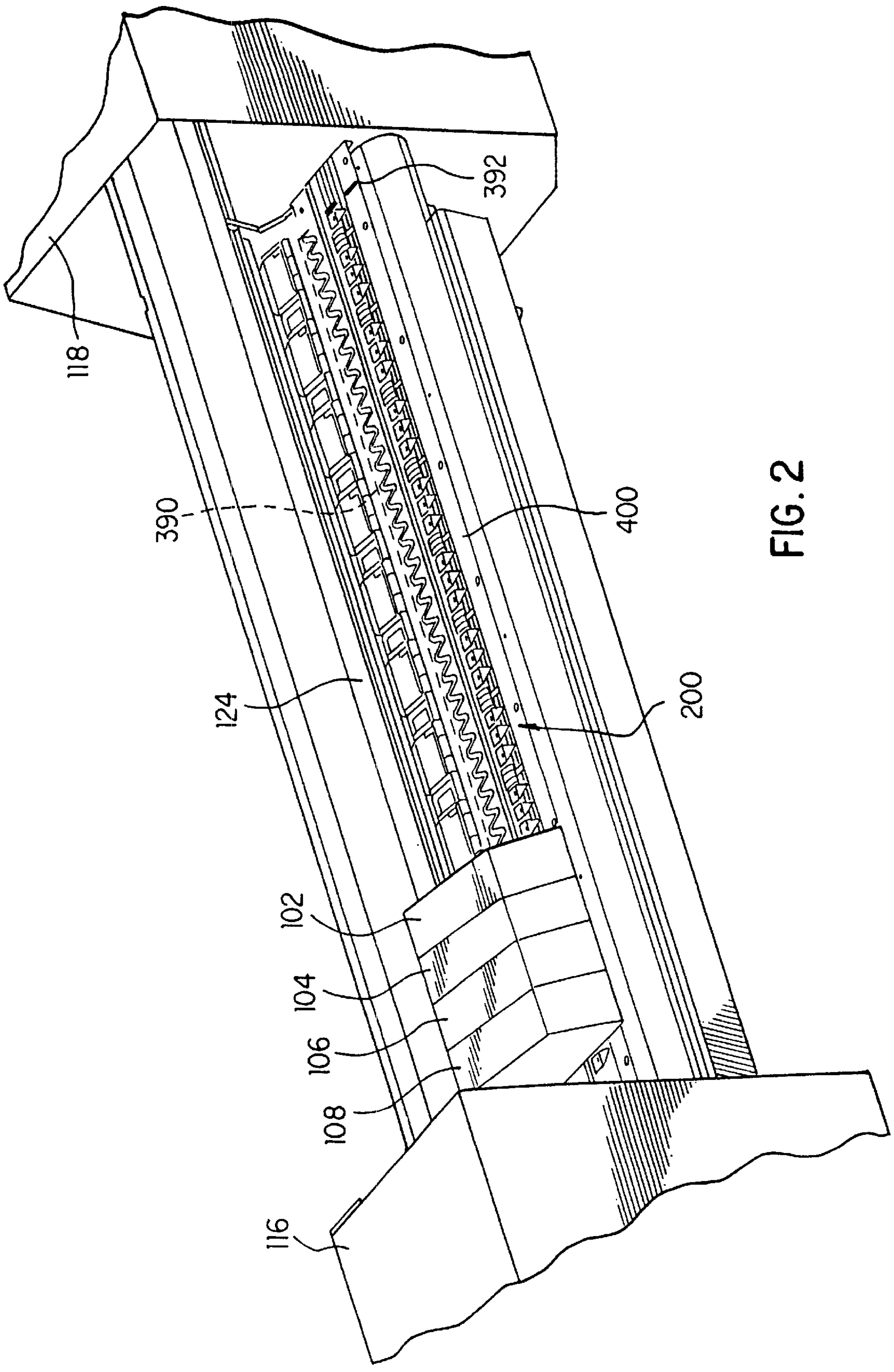
FIG. 2 is a more detailed diagram of a holddown system within the printer of FIG. 1.

Referring now to FIG. 2, an holddown system is globally referenced as 200. Such a holddown system 200 is located between the left and right drive mechanism enclosures 116 and 118. The width of the holddown system along the Y axis is at least equal to the maximum allowable width of the media. In this example it should allow the employment of medium having width up to 36", i.e. 914 mm. A more detailed description of the various components of the holddown system 200 will be made further with reference to FIG. 3. The inkjet printheads 102, 104, 106, 108, are held rigidly in the movable carriage 100 so that the printhead nozzles are above the surface of a portion of the medium 130 which lays substantially flat on a flat stationary support platen 400 of said holddown system 200.

Figure 3:
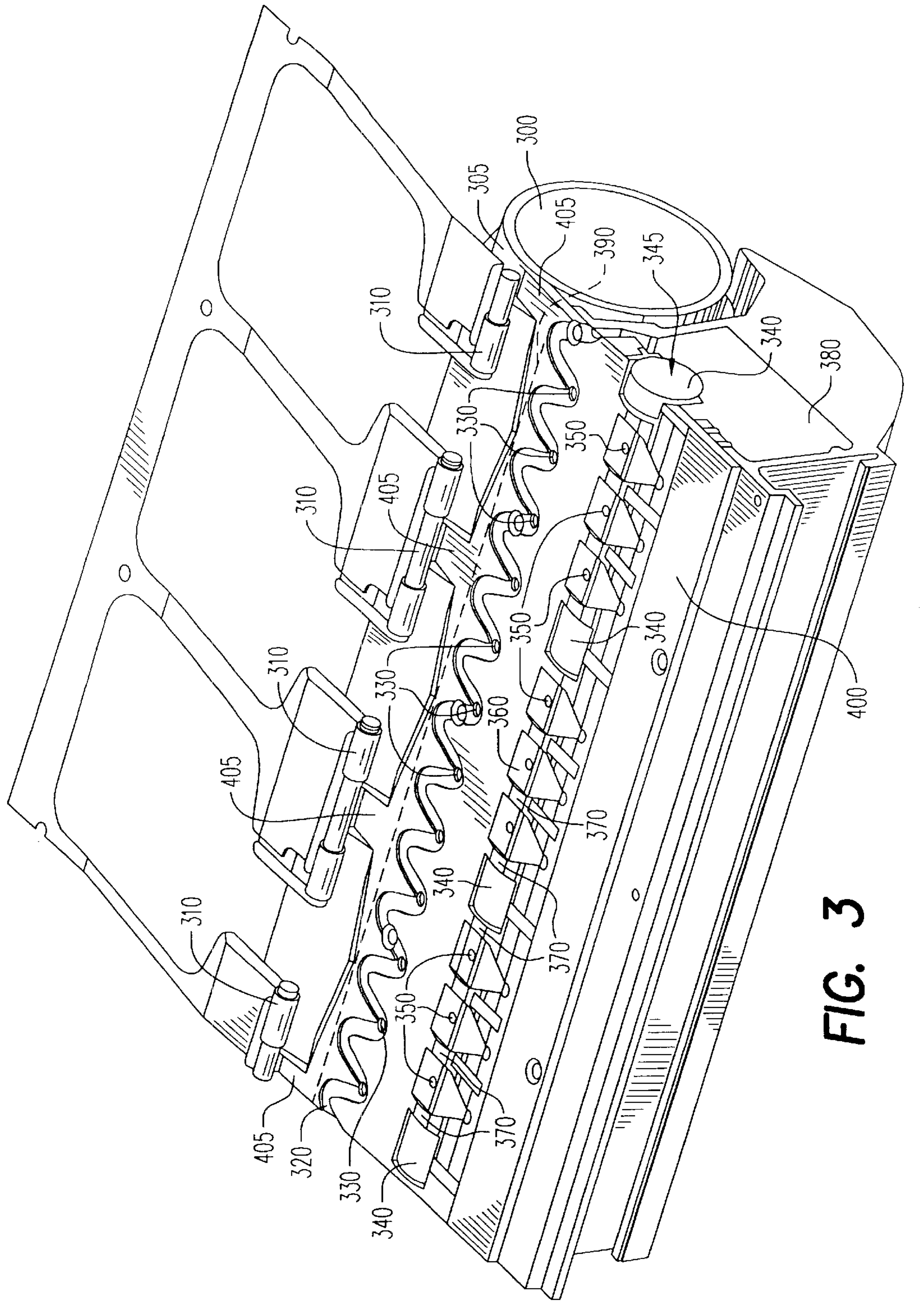
FIG. 3 depicts a portion of the holddown system of FIG. 2.

With reference to FIG. 3, the flat platen 400 is shown in more details, and is located in a front position of the printer 110 and co-operate with a main driving roller 300, in the following identified also as the main roller, located in a rear position, and a plurality of pinch wheels 310, in this example 12 pinch wheels 310 are employed, which are controlled to periodically index or convey the medium across the surface of the platen 400. The force between each pinch wheels 310 and the main roller 300 is comprised between 3.33 N and 5 N, preferably 4.15 N.

This pinch wheel distribution and force helps to drive the medium 130 straight with irrelevant lateral slippage, to share the medium 130 expansion on all its width. In fact has been observed that printers with low forces, e.g. about 1 N, allow media expansion accumulates in a particular place and this may cause a wrinkle to get so big to create a crash of the printhead.

The main roller 300 is provided with a conventional surface having a plurality of circumferencial recesses 305 housing a corresponding plurality of protrusions 405 of the platen 400 extending towards the rear of the printer 110. This combination of features allows the medium 130 to reliably move from the main roller 300 to the platen 400 and vice versa. In fact the gap between the roller 300 and the platen 400 may allow an edge of the medium to engage the back of the platen itself causing a paper jam.

The printer 110 comprises, a vacuum source, in this case a fan not shown in the drawings, connected to the atmosphere through a plurality of holes, or apertures, 330, 350 and a vacuum channel 380; such vacuum source generates an air flow by sucking air from the atmosphere.

Due to the pressure differential between atmosphere pressure on the surface of the medium 130 and the vacuum applied through the vacuum channel 380 and the holes 330, 350 to the back of the medium, the portion of the medium 130 close to the holes 330, 350 is suckingly adhered to the platen 400.

In order to reduce the losses of air from the vacuum channel 380, the holes 330, 350 are distributed at a certain distance from the main roller. According to this embodiment a plurality of first holes 330 lays in a line at a distance comprised between 10 mm and 30 mm, preferably 19 mm and a plurality of secondary holes 350, distributed preferably in line.

Furthermore, the platen 400 is provided, according to this preferred example, with a plurality of substantially linear grooves having one end closer to and the opposed end further from the main roller 300. Such grooves are linked together to form a continues slot 320, which crosses substantially the whole width of the platen 400, where such a continuous slot 320 is arranged to have a waved shape.

The plurality of first holes, or slot holes 330, having a diameter comprises between 1.5 mm and 3.5 mm, preferably about 2.5 mm, are then distributed inside the waved slot 320, and in this embodiment are preferably located in the further part of the slot 320 with respect to the main roller 300.

It is important to note that since the main roller 300 is not included within the vacuum channel 380, the vacuum can be only directly generated at a certain distance from the main roller 300 itself. However, if the slot 320 is included in the unit, when the vacuum source is activated and in presence of a medium on the platen 400, the vacuum can be expanded along all the slot extending the vacuum closer to the main roller 300.

In this application extending the vacuum means that the vacuum generated at one aperture, which is normally supplied to an area of the back of medium, is now supplied to an area of the back of the medium which is at least 10% bigger, preferably bigger than 500%.

This helps in more uniformly apply the vacuum to the back of the medium, reducing the risk of having peak of vacuum that may crease the medium. Furthermore, thanks to the slot 320 there is no need to conventionally include the main roller 300 into the vacuum channel 380 and this means that: a) the air losses are minimized, since in conventional systems, having the main roller included in the vacuum channel, most of the air is lost around the main roller itself; b) the air flow is forwarded towards the main roller 300, meaning that a print zone 450 can be defined closer to the main roller 300; and c) the dimensions of the vacuum channel can be better controlled, giving more design freedom for designing the holddown system.

Size of the vacuum channel is a further parameter relevant to apply the proper vacuum to the back of the medium. Experiments run by the Applicant have shown that the surface of squared section of the vacuum channel 380, as depicted in FIG. 3, is preferably bigger than the sum of the surface of all the apertures 330, 350 distributed within the platen 400. More preferably the surface of the squared section is as big as twice, or more, the sum of the surface of all the apertures 330, 340.

According to the above, it is possible to print closer to the edges of a cut medium. In fact the medium can still be indexed by the main roller 300 and the pinch rollers 310 even when we are printing close to the very end of the medium itself.

Applicant's extended tests have revealed that a width too wide of the slot can reduce the capability of maintaining the medium substantially flat while printing, so affecting the printing quality. On the contrary, a width too narrow and/or an insufficient depth may affect the air flow direction, i.e. the vacuum force is not extended close enough to the main roller 300.

Furthermore, high vacuum may crease the paper especially if the grooves of the slot 320 are wide and run parallel to the paper advance direction. Therefore is advisable to run the grooves at about 450 respect to the media axis X and optimise the slot width to minimize creases in the paper and to evenly distribute the vacuum. In addition, if the groove is parallel to the advance direction, it may make the ink to migrate and create localised dark areas.

This means that it is not necessary that the plurality of grooves are linked together in order to form a continuous slot for achieving the above advantage.

Accordingly, the slot 320 has a depth deeper than 0.5 mm, preferably 1 mm, and a width comprises between 3 mm and 8 mm, preferably 5 mm.

However, the continuous shape of the waved slot 320 helps the holddown system 200 to evenly distribute the vacuum along the print zone 450. In fact, an interrupted sequence of grooves may create areas, having a reduced vacuum, which cross the complete print zone 450, in the media axis direction X. This may force the ink applied in those areas to migrate and create localised dark or clear portions in the printout.

Further from the waved slot 320, along the media axis (X), the platen 400 is provided with a plurality of secondary recesses 360, distributed in one line along the scan axis (Y). In this example each recess 360 is composed by two parts, a first one substantially squared and a second one substantially triangular, where the triangular part lays on a plane which deeper than the plane on which the squared part lays.

Furthermore, each squared part is provided with a secondary hole 350, having a diameter comprises between 1.5 and 2.5 mm, preferably 2.0. Such sequence of secondary recesses 360 is combined with a sequence of overdrive wheels 340, forming a secondary roller 345, such that a group of 3 consecutive secondary recesses 360 is disposed between two consecutive wheels 340. Such a secondary roller is housed in the vacuum channel 380.

Thus, this holddown system 200 comprises 12 overdrive wheels 340 equally separated along the scan axis (Y) to supply equal traction to each part of the medium.

In this description an overdrive wheel may mean a single wheel as well as a plurality of wheels in strict contact one to another, in order to build a wheel having a larger width.

A secondary recess 360 is distanced by each adjacent element, both a further secondary recess 360 or a wheel 340, by a rib 370. The ribs are employed to reduce the risk of generating cockle wrinkles which may extend towards the print zone 450.

Accordingly, two consecutive ribs 370, having a preferably height of 1 mm, are distanced one to another by a distance comprised between 15 mm and 25 mm, preferably about 20 mm if the two ribs 370 are separated by a secondary recess 360.

The plurality of secondary holes 350 provides the vacuum channel 380 with further apertures for the air flow generated by the vacuum source.

Since the air flow between the top of the platen 400 and the back of the medium 130 may generate noise in correspondence of the secondary holes 350, the particular shape of the recesses 360 helps to provide the air flow with a smooth transition, reducing the resulting noise.

As for the slot holes 330, the vacuum generated in correspondence of the secondary holes 350 is extended, in order to apply a negative pressure to most of the medium 130 laying on the platen 400. The vacuum is extended particularly due to the presence of the overdrive wheels 340, and the ribs 370, which create a larger empty space between the medium 130 and the platen 400.

Furthermore, the design of this part of the holddown system helps the printer to reduce the cockle effect on the printout.

Tensioning the paper in the feeding direction intuitively does not help, because cockle wrinkles mainly extend in the feeding direction as well. Anyway, overdrive forces can reduce the height reached by the cockle wrinkles by as much as a half. In addition, it was noted how the paper works in compression, some very thin papers may even buckle and create loops between the main roller 300 and the print zone.

This means that the presence of a secondary roller 345, having the function of tensioning the paper during the printing operation, may help in controlling the occurrence of the cockle wrinkles in the printout.

However, it should be kept in mind that such a secondary roller 345 provide the printer 110 with more capabilities, which will be described further.

In this portion of the platen 400, vacuum is furnished through the plurality of holes 350 and the gap between each overdrive wheel 340 and its surrounding portion of the platen 400.

Vacuum is used to provide the force between medium and overdrive wheels 340; the design has been done in such a way that it can provide the required force to the overdrive wheel 340, preferably comprised between 0.6 N and 1 N, in this example 0.8 N per each wheel 340, without employing starwheels. Elimination of starwheels is an important issue since it helps to avoid a) the risk of damaging the printout with starwheel marks, b)the need to employ a mechanism or a structure to hold the starwheels themselves.

In addition, according to this example, in order to transmit the proper traction force to the medium, the overdrive interference, i.e. the distance between the surface of the platen 400 and the top of the a overdrive roller 340, is preferably maintained between 0.3 mm and 0.6 mm. Below 0.25 mm the traction falls quickly, towards zero traction at zero interference; if the interference is bigger than 0.65 mm, wrinkles created by the overdrive roller 340 can extend to the print zone 450.

In FIGS. 2 and 3 it is also shown a first reference sign 390, according to this example, in the form of a phantom line, but any kind of suitable reference can be employed, e.g. a continuous or dotted line. This first reference 390 is traversing all the platen 400 from the right to the left side in the scan axis (Y) direction. Preferably the first reference 390 is tangent to the slot 320, on the side closer to the main roller 300, and it could be in colour and/or in under-relief. This feature is used preferably in combination with a second reference 392, placed at one side end of the platen 400. The second reference is traversing the platen 400 in the media axis (X) direction, preferably starting from the first reference 390 to the end of the platen 400 further from the main roller 300.

Accordingly, the user is provided with two references for placing correctly the edges of a cut media sheet, or a media roll, onto the platen 400 in order to load and feed the sheet into the printer 110. Particularly, the first reference 390 is providing the user with a reference which can fully match an edge of the sheet, so simplifying the loading operation.

In this embodiment a second reference is placed at one end of the platen 400, which is conventionally located at the right end of the printer, respect to the user placing the sheet.

This combination of references enhances the easiness of the loading operation by the user, reducing the occurrence of inaccurate positioning of the medium, which may cause a paper jam, during the feeding or the printing phases.

Figure 4:
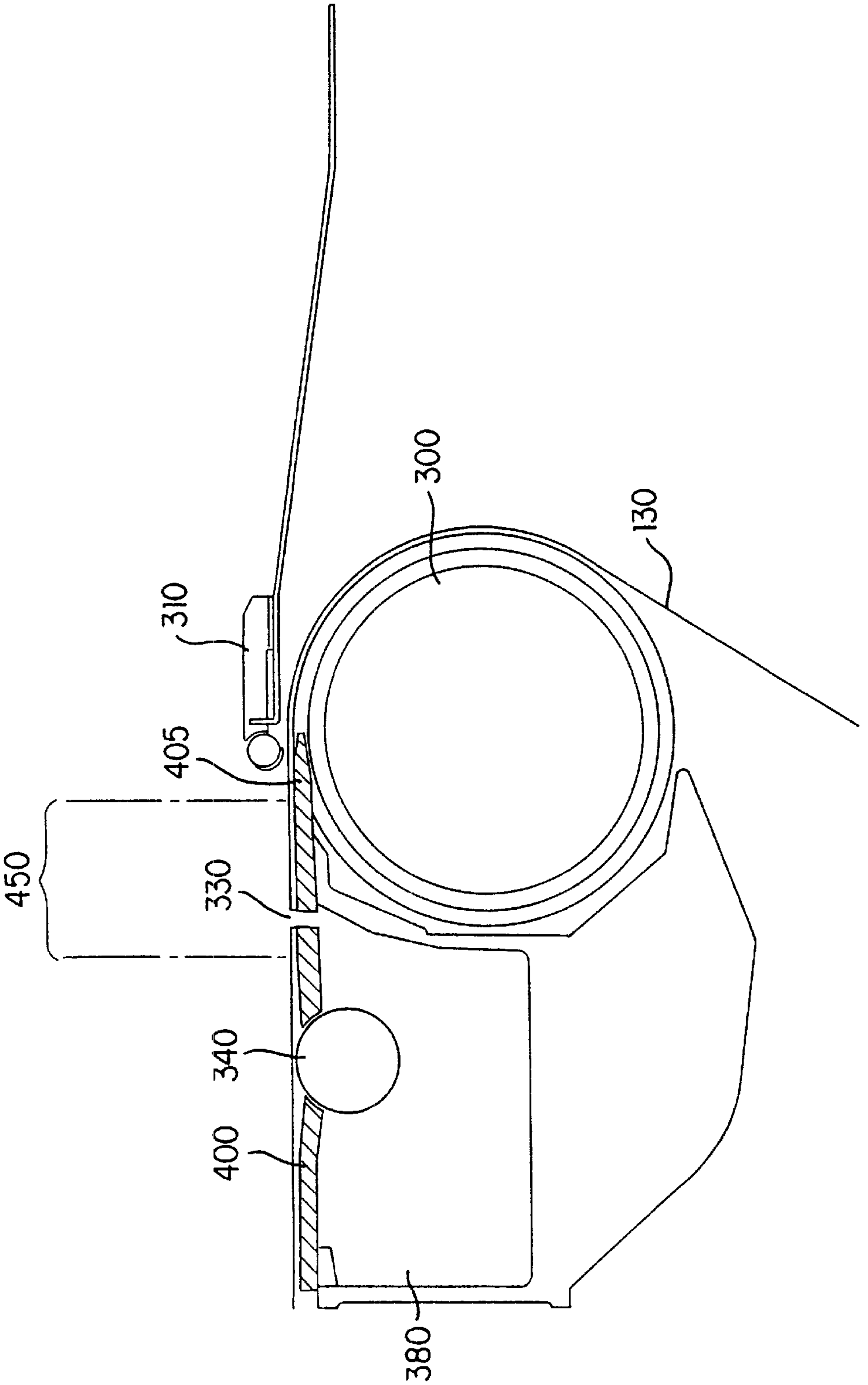
FIG. 4 is a section of the main hardware components of the holddown system within the printer of FIG. 1.

Referring now to FIG. 4, it is shown the main roller 300 and one of the pinch wheels 310 co-operating with one protrusion 405 of the platen 400 holding the medium 130. One of the overdrive wheels 340, tensioning the medium 130 in the print zone 450, is also shown. From FIG. 4 it is better depicted that the vacuum channel 380 does not extend underneath the complete print zone 450, particularly the vacuum channel 380 is partially overlapped by a portion of the print zone 450 which is less than 90% of the complete print zone 450, preferably less than 50%, and more preferably about 30–35%.

Figure 5:
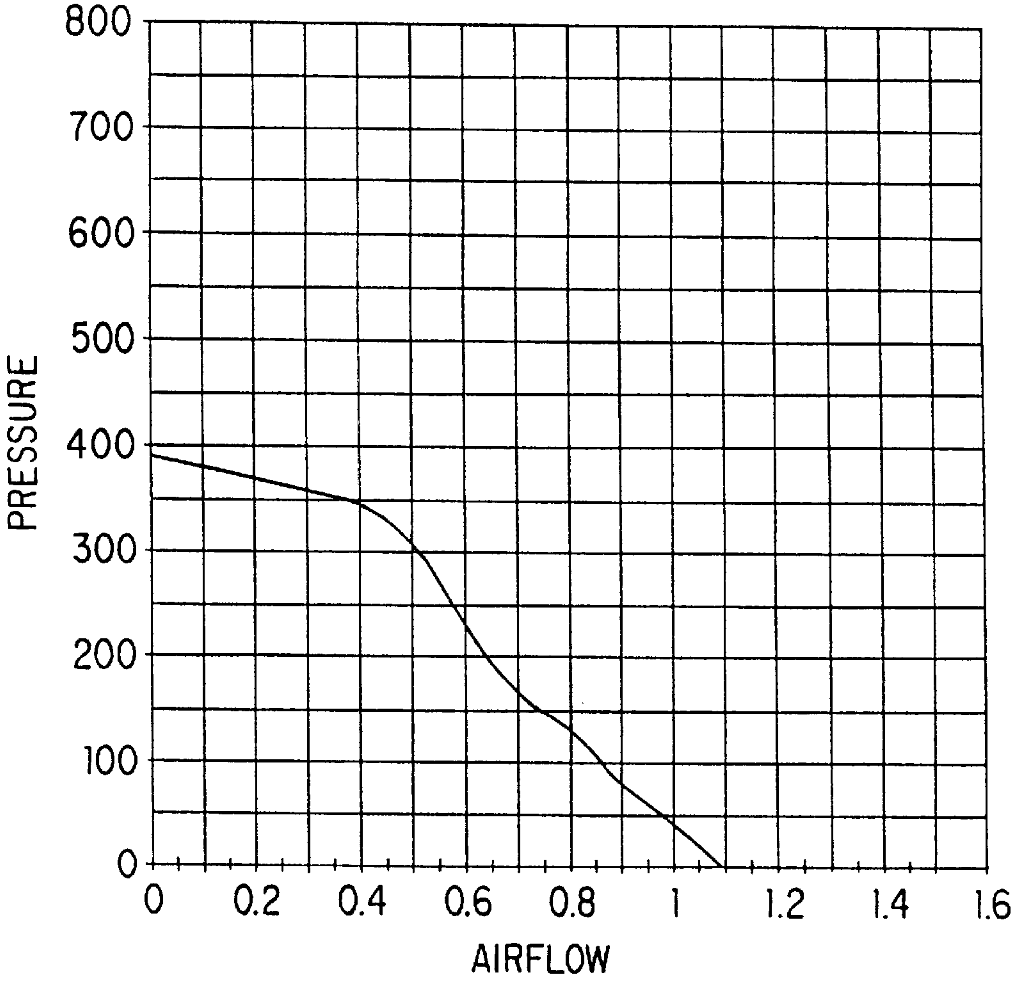
FIG. 5 depicts a test curve of nominal values of the pressure applied to a medium vs. air flow provided by a vacuum device, employed in the holddown system of the preceding figures, in the rated voltage of 24 V.

Referring now to FIG. 5, a diagram showing nominal values supplied by the vacuum source, a fan, employed in this example. Those values have been measured running the fan at its full power of 24 V. The pressure unit on the Y axis is Pascal and air flow unit on the X axis is $m^3$/min.

Vacuum required to eliminate cockle wrinkles in a printer would be so high that is normally unfeasible; in fact, high vacuum may suck the ink right through the paper and at the same time generate a lot of noise.

The vacuum level has been preferably set between 380 Pa and 440 Pa, which can be achieved by a small fan, producing acceptable level of noise, i.e. about 65 dBA.

Several test run by the Applicant have verified that this level is enough for rigid roll paper, like high glossy photo roll, in order to flatten the curling during printing. In addition, it has been verified with many print modes that this level of vacuum is unlikely to suck the ink through the paper.

Five operational levels of vacuum have been defined for the following activities:

| | |
|---|---|
| Normal CAD printing | 21 V |
| Thick paper and high density prints | 24 V |
| Loading and cutting media | 22 V |
| Hoiddown during cut sheet ioading | 16 V |
| Managing thin Japanese rice paper, always | 14 V |

According to FIG. 5 and to the tests run by the Applicant, one characteristic of the fan considered particularly valuable has been the capability of providing a pressure of 300 Pa, when the air flow is at about 0.5 $m^3$/min.

Now reference is made to FIGS. 1, 2, 3 and 4 in order to describe how a medium can be loaded into, printed with and outputted from the printer 110.

LOADING OPERATION

A loading operation can be activated in a plurality of different ways, e.g. by a user selection of the operation from the front panel 120 of the printer 110, or more easily, as in this embodiment, by opening the cover 122.

Once that the loading operation is activated the vacuum source is powered on, at 16 V, in order to help the loading operation.

In the following an example on how to load a cut sheet of media will be described. However a skilled in the art may appreciate that, similarly, a roll of media may also be load.

In order to load a cut sheet of media into the printer, a user should place the top edge of the medium 130 in correspondence of the first reference 390, and the top portion of the right edge of the same medium 130 in correspondence of the second reference. During all this phase the vacuum on is helping the user in holding the medium 130 adherent to the platen 400, so that small adjustments in the position of the medium 130 can be done using only one hand. Accordingly, the risk of inadvertently damaging the medium 130 (e.g. due to fingerprints or to the fall of the medium 130 on the ground) are minimized.

Once that the loading step has been completed, the medium 130 is fed into the printer for the printing phase. The feeding step may be activated in several ways. For instance, it is automatically activated after that sensors have sensed the proper positioning of the medium 130, or by user selection of the feeding operation from the front panel 118, or, as in this embodiment, by closing the cover 122.

Once that feeding step is activated, the overdrive wheels 340 start to move clockwise in order to advance the medium 130 towards the main roller 300, until the medium 130 itself is engaged between the main roller and the pinch wheels 310. The vacuum is maintained on to transmit the traction force from the overdrive wheels 340 to the medium 130.

As soon as main roller is fed with the medium 130, conventional steps are carried on in order to remove the medium 130 from the platen 400 and to convey the medium 130, into a feeding guide for a subsequent printing phase. Finally, the vacuum source is switched off.

PRINTING OPERATION

When a printing operation is activated, the main roller 300 in co-operation with the pinch rollers 310 and other conventional elements of the printer 110, starts to convey the medium, from the feeding guide, across the print zone defined onto the platen 400. Contemporarily, the vacuum source is switched on, at a power according to the kind of media employed and/or to the kind of plot which will be printed. Thus, the vacuum is keeping the medium 130 substantially flat onto the print zone 450 defined on the platen 400 to allow a quality printing. Preferably, before starting printing, the main roller is advancing the medium towards the overdrive wheels 340, to have the medium engaged by them. In fact, as already explained, the medium should be tensioned in the media direction X to keep the cockle wrinkles under control. Alternatively, the printing may start even if the overdrive wheels 340 are not engaged yet with the medium.

Once that the medium 130 is also engaged by the overdrive wheels the advance of the medium in the print zone along the media axis direction X is performed by a pushing force provided by the main roller 300, moving counter-clockwise, and the pinch wheels 310, moving clockwise, and by a pulling force provided by the overdrive wheels 340, moving counter-clockwise too.

Conventional printing steps allow the carriage assembly 100 to move the printheads 102, 104, 106, and 108, relative to the medium 130 along the scan axis Y, in order to apply ink to the medium 130, in one or more passes, and so reproducing the desired image.

OUTPUTTING OPERATION

An outputting operation may be activated for instance a) automatically when a printing operation has been completed or aborted, or b) manually by a user request.

When the operation is activated the printer verifies if the medium 130 to be outputted is a cut sheet or a roll. If the medium 130 is a roll a cutting step is performed. This means that the medium 130 is advanced in the cutting position and the vacuum source is powered on, at 22 V, to hold the medium substantially flat and minimize the movement of the same while a blade, not show, is traversing the medium 130 along the scan axis Y to cut the medium.

If the medium 130 is a cut sheet or after that the roll has been cut, the medium is advanced in the media axis direction X towards the front of the printer 110, i.e. further from the main roller 300.

The advancement of the medium is performed by the counter-clockwise movement of the overdrive wheels 340, frictionally engaging a portion of the back of the medium 130, due to the negative pressure generated by the vacuum source applied to the medium 130. If a cut sheet of media 130 is still engaged with the main roller 300 and the pinch wheels 310, those elements are also co-operating to advance the medium.

In case that the printout printed onto the medium 130 requires an additional dry time, the overdrive wheels movement is stopped when most of the printout is advanced out of the printer, e.g. as shown in FIG. 1. The vacuum source is kept on for the required time to dry the medium, so holding only an end region of the medium 130, preferably having length equal to the width of the medium 130 and about 50 mm in the media axis direction X.

Finally, the vacuum is switched off to drop the medium 130, e.g. into a conventional collecting bin, not shown.

The skilled in the art may appreciate that, in accordance to this preferred embodiment, the same holddown system, e.g. having one platen and one vacuum source, may be capable of being employed to perform a plurality different operations, such as loading and feeding operation, printing operation and outputting operation. However, each of this operations may be performed also using independent holddown systems, i.e. independent holddown surfaces and/or independent vacuum source. Furthermore, the skilled in the art is now aware that only some of those operations may be performed by means of a vacuum holddown system while the remaining ones may be performed employing conventional systems.

What is claimed is:

1. A hardcopy apparatus comprising:

a main roller; and a loading mechanism to load a medium into said hardcopy apparatus, said loading mechanism comprising:

a vacuum holddown input unit to hold media down onto a non moving surface of said holddown unit comprising;

a vacuum source, connected to atmosphere through a plurality of first apertures formed into said surface; and a vacuum channel to generate a negative pressure capable of holding down said media onto the surface, while loading said medium, wherein said surface comprises a plurality of recesses.

2. The hardcopy apparatus as claimed in claim 1, wherein at least one of said plurality of first apertures is located in one of said plurality of recesses.

3. The hardcopy apparatus as claimed in claim 1, wherein at least one of said plurality of recesses comprises a first portion capable of uniformly distributing the vacuum on an area substantially bigger than the aperture itself, and a second portion shaped to produce less air flow noise interference with said media than a recess without said second portion.

4. The hardcopy apparatus as claimed in claim 1, wherein said holddown unit further comprises a plurality of second apertures formed into the surface to create an additional negative pressure capable to increase the stability of media onto the surface.

5. The hardcopy apparatus as claimed in claim 4, wherein said holddown unit further comprises means to extend the additional negative pressure to a position closer to the drive roller.

6. The hardcopy apparatus as claimed in claim 5, wherein said means for extending the negative pressure comprise a plurality of grooves extending towards the drive roller and a number of said plurality of second apertures are located within said grooves.

7. The hardcopy apparatus as claimed in claim 6, wherein each aperture of said plurality of second apertures being located within a groove.

8. The hardcopy apparatus as claimed in claim 6, wherein the holddown unit further comprises a first reference for placing the medium in a correct position on the surface, said first reference crossing the surface in the direction perpendicular to the direction of motion of media.

9. The hardcopy apparatus as claimed in claim 8, wherein the holddown unit further comprises a second reference for placing the medium in the right position on the surface, said second reference crossing the surface in the direction of motion of media.

10. The hardcopy apparatus as claimed in claim 8, wherein said first reference is tangent to the portion of the grooves closer to the main roller.

11. The hardcopy apparatus as claimed in any claim 1, wherein said holddown unit further comprises feeding means, wherein said negative pressure causes a back side of said medium to engage said feeding means and transfer said medium to said drive roller.

12. The hardcopy apparatus as claimed in claim 11, wherein said feeding means comprises one or more overdrive wheels disposed to form on the surface an alternating sequence of recesses and overdrive wheels in the direction perpendicular to the direction of motion of media.

13. The hardcopy apparatus as claimed in claim 1, wherein said medium is a cut sheet of media.

14. A method of loading a medium into a hardcopy apparatus including a holddown unit provided with a vacuum source, a main driving roller and a secondary roller, comprising:

manually positioning only a portion of said medium onto a surface of the holddown unit while said medium is stably held;

releasing said medium when correctly positioned on said surface;

by rotating the secondary roller, advancing the medium towards the main roller; and engaging the medium to the main roller.

15. The method as claimed in claim 13, further comprising the step of keeping the vacuum source activated during all the methods steps of claim 14, in order to achieve the engagement of the secondary roller with the back of the medium.

16. The method as claimed in claim 14, wherein the hardcopy apparatus further comprises one or more wheels and the step of advancing the medium comprises the step of rotating said one or more wheels to cause advancement of the medium.

17. A hardcopy apparatus comprising:

a main roller; and a loading mechanism to load a medium into said hardcopy apparatus, said loading mechanism comprising:

a vacuum holddown input unit to hold media down onto a surface of said holddown unit comprising;

a vacuum source, connected to atmosphere through a plurality of first apertures formed into said surface;

a vacuum channel to generate a negative pressure capable of holding down said media onto the surface, while loading said medium; and a secondary roller, wherein said negative pressure causes a back side of said medium to engage said secondary roller and transfer said medium to said main roller;

wherein said surface comprises a plurality of recesses.

18. The hardcopy apparatus as claimed in claim 17, wherein said secondary roller comprises one or more overdrive wheels disposed to form on the surface an alternating sequence of recesses and overdrive wheels in the direction perpendicular to the direction of motion of media.

* * * * *